United States Patent [19]

McEachern, Jr.

[11] Patent Number: 5,139,082

[45] Date of Patent: Aug. 18, 1992

[54] COOLING SYSTEM FOR A LIQUID COOLED ENGINE

[75] Inventor: J. Albert McEachern, Jr., Mobile, Ala.

[73] Assignee: Teledyne Industries, Inc., Los Angeles, Calif.

[21] Appl. No.: 575,953

[22] Filed: Aug. 31, 1990

[51] Int. Cl.⁵ ............................................. F01P 11/02
[52] U.S. Cl. ........................... 165/104.32; 123/41.51; 123/41.54; 165/104.27
[58] Field of Search .............. 165/104.27, 917, 104.32; 123/41.51, 41.54

[56] References Cited

U.S. PATENT DOCUMENTS

| | | | |
|---|---|---|---|
| 1,930,387 | 10/1933 | Guernsey | 165/104.32 |
| 3,254,707 | 6/1966 | Ferguson | 165/104.32 |
| 4,064,848 | 12/1977 | Pabst et al. | |
| 4,175,616 | 11/1979 | Pabst et al. | |
| 4,199,332 | 4/1980 | Krohn et al. | 165/104.32 |
| 4,231,424 | 11/1980 | Moranne | 165/104.32 |
| 4,352,683 | 10/1982 | Vogel | |

Primary Examiner—Albert W. Davis, Jr.
Attorney, Agent, or Firm—Gifford, Groh, Sprinkle, Patmore & Anderson

[57] ABSTRACT

A cooling system for a liquid cooled engine comprises a first fluid line interconnecting the coolant exhaust port of an internal combustion engine and an exchange tank having a high pressure region and a low pressure region, a second fluid line interconnecting the high pressure region of the exchange tank and a heat exchanger, a third line interconnecting the heat exchanger and the inlet of a coolant pump attached to the coolant input port of the engine, and a fourth coolant line interconnecting the low pressure region of the exchange tank and the third line. The fluid contained within both the low and high pressure regions is of engine discharge temperature. By this arrangement the pressure maintained at the coolant inlet of the pump and the low pressure region of the exchange tank is equal. The low pressure region is preferably a tank situated within the high pressure region, thereby resulting with a tank being situated within a tank. Any gas or vapor in the fluid coming from the engine is disposed into the low pressure region by an aperture defined between the two regions.

12 Claims, 1 Drawing Sheet

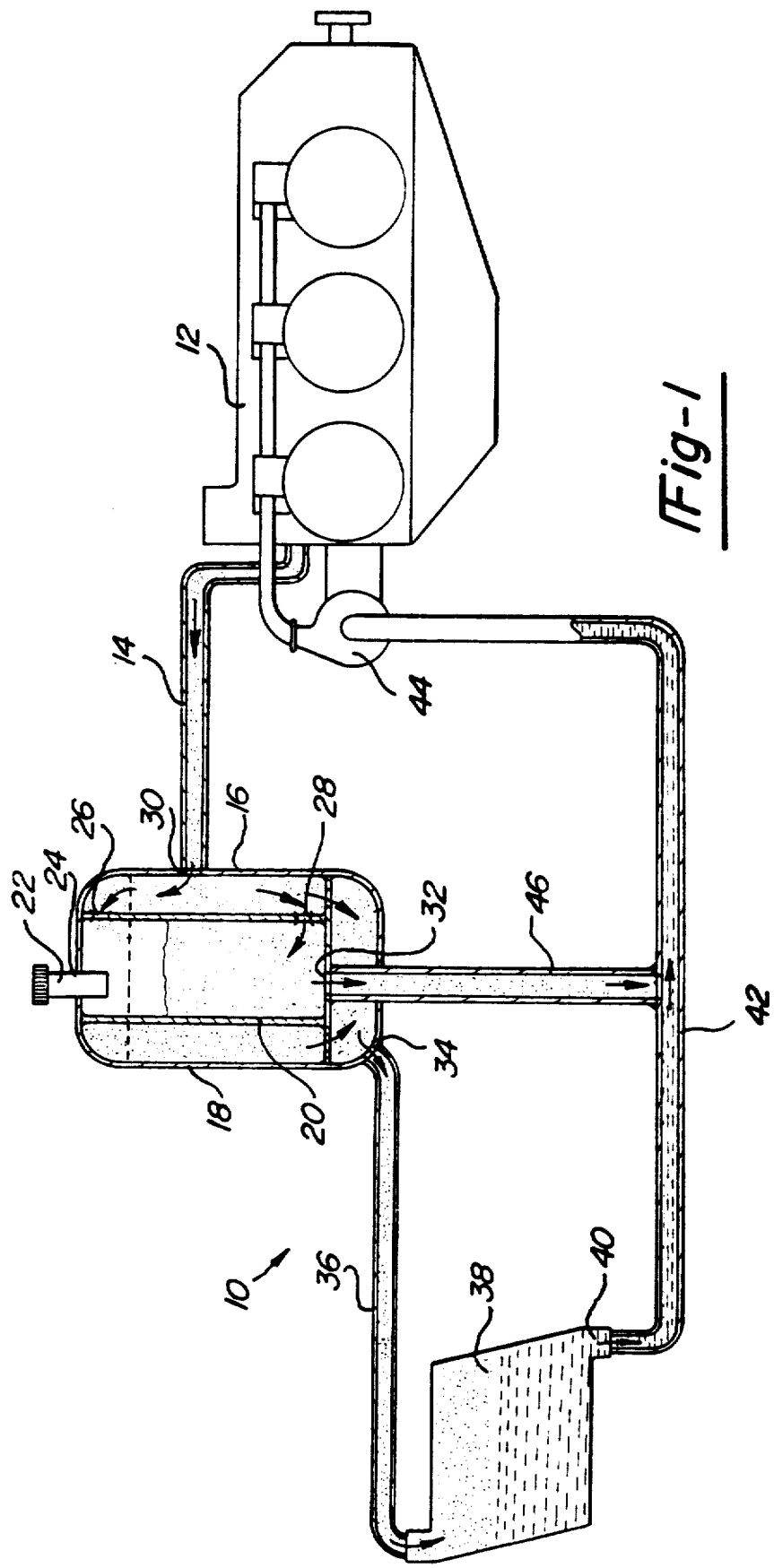

COOLING SYSTEM FOR A LIQUID COOLED ENGINE

BACKGROUND OF THE INVENTION

I. Field of the Invention

The present invention relates generally to cooling systems for liquid cooled internal combustion engines. More particularly, the present invention relates to such systems where maximum inlet pressure at the coolant pump is maintained.

II. Description of the Relevant Art

The cooling of internal combustion engines has taken many different courses throughout the life of the engine. While the need for cooling was understood, different approaches led to different results.

Some internal combustion engines relied singularly upon air cooling, such as radial airplane engines and the rear-mounted Volkswagen engine of the "Beetle".

However, it was commonly held that liquid cooling was almost universally preferred to air cooling, in that while being more complex, liquid cooling was discovered to be a more efficient method of cooling the engine.

The early Ford Model "T", for example, relied upon a liquid cooling system that utilized a liquid coolant and a radiator, but no coolant pump. The coolant was circulated by a "thermo-siphon" system, whereby the heated coolant naturally flowed upward toward the top of the radiator, was cooled, and naturally flowed downward to the base of the radiator and back into the engine for recirculation.

This approach, however, was not satisfactory, and generally it was found that for maximum efficiency, a coolant pump was necessary, whether the engine being cooled was in a motor vehicle or in an airplane.

Not all coolant systems, however, served all needs. For example, in the automotive engine the cooling system typically has low pressure differentials across the system components and only a small pressure rise across the system is realized, perhaps in the range of four or five PSI. The conventional heat exchanger/pump system works well enough for these purposes.

However, in coolant systems such as that employed in the new generation of aircraft liquid cooled engines the object is to make the overall system light and able to achieve high performance. These engines employ a much higher pressure differential across the heat exchanger in order to minimize the weight and bulk of the cooling system. As a consequence, a much higher pressure rise across the fluid pump, that pressure having an upward end of sixty to seventy-five PSI. (General aviation uses are in the range of thirty to thirty-five PSI, although this pressure is still considerably higher than that found in the conventional automobile.)

The problem primarily encountered in such systems is that maximum pressure at the fluid circulating pump inlet is not acheived due to cavitation causing gas pockets to form around the pump itself. Because gas is highly compressible, if the pocket exists at the pump discharge, as soon as the pump is energized, the gas is compressed to possibly sixty or seventy-five PSI, thus creating a suction at the inlet.

Conversely, it is desirable to operate the system at the maximum temperature while at the maximum pressure because the captured gas will ultimately expand. Accordingly, the object is to operate the system at the temperature of the coolant leaving the engine, not the temperature of the fluid leaving the heat exchanger.

However, prior approaches have failed to solve the problem of providing maximum pressure at the pump inlet while still acheiving the necessary benefits of engine cooling.

SUMMARY OF THE PRESENT INVENTION

The present invention provides a cooling system for a liquid cooled engine which overcomes the problems of known cooling systems by providing maximum coolant pressure at the coolant pump inlet.

The cooling system of the present invention comprises a first fluid line interconnecting the coolant exhaust port of an internal combustion engine and an exchange tank having a high pressure exterior region operating at engine discharge pressure and a low pressure interior region, the high and low pressure regions being separated by a tank wall. The exhaust tank is situated relatively close to the engine. The system further comprises a second fluid line interconnecting the high presure region of the exchange tank and at least one heat exchanger, a third line interconnecting the heat exchanger and the inlet of a coolant pump attached to the coolant input port of the engine, and a fourth coolant line interconnecting the low pressure region of the exchange tank and the third line.

The "high" pressure region and the "low" pressure region are only high and low regions in relative terms, and the low pressure region is only slightly less pressurized than is the high pressure region. Both the high pressure region and the low pressure region operate substantially at engine discharge temperature.

When the engine is running and the system is pressurized, the high pressure region contains only heated liquid coolant delivered directly from the engine, whereas the low pressure region contains a gas pocket and some coolant. The gas pocket is necessary for pressurization.

The high pressure region defines an annular fluid-containing space that surrounds the low pressure tank disposed preferably in substantially the middle of the exchange tank.

At least four apertures are defined in the tank housing the low pressure region. The first, and topmost, is an aperture for accomodating a liquid coolant filler tube. The second is a relatively small aperture at the upper end of the of the wall of the tank, situated above the level of coolant in the low pressure region. This aperture allows gas to leave the heated coolant being delivered from the engine and to enter the low pressure region.

The third aperture is also defined in the wall of the tank, but at its lower end, and serves to allow coolant to drain when emptying the system, and allows a small portion of coolant to bypass the heat exchanger.

The fourth aperture is defined preferably at the lowermost end of the low pressure tank and is fluidly interconnected with a line to lead a significant amount of still heated coolant fluid directly into the line going to the inlet end of the coolant pump, thus bypassing the heat exchanger.

Accordingly, the low pressure region is allowed to operate at pump inlet pressure and the high pressure region and its interconnected heat exchanger are allowed to operate at the level of pressure of fluid being discharged from the coolant pump and, consequently, the engine. (The pressure drop across the engine is negligible.) Accordingly, the high pressure region is operating at near both the maximum pressure and the maximum operating temperature, while the low pressure region is operating at near-maximum temperature and at the minimum pressure of the system.

The apertures defined in the low pressure tank provide a positive flow of coolant from the high pressure region to the low pressure region whereby gas is forced into the low pressure region. This relationship allows a pressure drop across the low pressure region tank, while still delivering high temperature thereto by the small amount of coolant entering with the gas and by the fact that the low pressure region tank is surrounded by high temperature coolant freshly delivered from the engine. Thus the low pressure region can operate at minimum system pressure, but at near-maximum system temperature.

Gas and steam bubbles are removed from the coolant immediately after discharge from the engine. Because the pressure of this (and any) liquid coolant system is controlled by a gas pocket (according to the present invention the gas pocket in the low pressure region is a combination of both steam and air), the gas pockets being the only substantially compressible portion of the system, the only place compression takes place according to the present invention is within the low pressure region. Combined with the direct fluid line interconnecting the low pressure region and the inlet of the pump, cavitation at the inlet line, the scourge of known systems, is avoided, as maximum pump inlet pressure possible in a hermetically sealed system is achieved.

The present invention may find application not only in uses in high pressure aircraft engines, but may be applied in any system utilizing high pressure drops.

Other advantages and features of the present invention will become apparent from the following detailed description when read in conjunction with the accompanying drawing.

BRIEF DESCRIPTION OF THE DRAWING

The present invention will become more fully understood by reference to the following detailed description of the preferred embodiment of the present invention when read in conjunction with the accompanying drawing, in which the drawing discloses a schematic representation of the system of the present invention.

DETAILED DESCRIPTION OF THE PREFERRED EMBODIMENT OF THE PRESENT INVENTION

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

The figure discloses a preferred layout for the system of the present invention and is intended to be representative only in that it discloses the fundamental elements of the system.

The coolant flowing within the system, the system being generally indicated as 10, is heated in the internal combustion engine 12. The engine 12 is shown here as being a six-cylinder opposed-type aircraft engine. Of course, as noted above, this invention may be applied to different types of liquid cooled engines utilizing high pressures.

An engine coolant outlet line 14 is shown carrying coolant away from the engine toward an exchanger tank 16. The exchanger tank 16 includes an outer tank 18 and an inner tank 20. As illustrated, the different fluid levels between the outer tank (where there is no gas pocket) and the inner tank (where there is a gas pocket), is illustrated as the coolant system would appear under pressure. However, the broken line illustrates the coolant level as it would appear when there is no pressure on the system.

At the top of the tank 16 is provided a filler tube 22. Of course, the filler tube may have a different appearance or may be situated in a different position, and is here shown for illustrative purposes only. However, it should be noted that the filler tube is preferably positioned to prevent over fill in that the base of the tube extends below the upper wall of the tank 16 and somewhat into the space defined by the inner tank 20. The filler tube 22 is fitted within a first orifice 24.

A second orifice 26 is defined between the inner tank 20 and the outer tank 18. The orifice 26 is situated somewhat above the level of coolant fluid within the inner tank 20. By this construction, bubbles from the coolant are directed through the orifice. The orifice 26 is preferably between 4 mm and 6 mm in diameter.

A third orifice 28 is defined at the lower part of the inner tank 20 to fluidly interconnect the inner tank 20 and the outer tank 18. The orifice 28 serves the function of draining any excess fluid that may enter the tank 20 through the orifice 26 with the gas bubbles. Like the orifice 26, the orifice 28 is preferably between 4 mm and 6 mm in diameter.

According to this construction, the inlet line 14 is connected to the outer tank 18 at a junction 30. When the fluid enters the junction 30, the gas bubbles tend to go to the center and top of the fluid volume due to the cyclone effect and gravity, respectively. Accordingly, the bubbles move up toward the orifice 26.

The exchange tank includes a fourth orifice 32 defined at the base of the inner tank 20. The fourth orifice 32 allows for heated, minimally pressurized fluid to escape the inner tank and to reenter the system bypassing the heat exchanger as will be described below.

While some of the fluid entering the exchange tank 16 is caused to enter the inner tank 20, the bulk of the fluid is allowed to circulate about the inner tank 20 and ultimately exhaust the exchange tank 16 through an escape port 34 interconnecting the exchange tank 16 and a tank-to-radiator line 36.

The line 36 carries hot fluid to the heat exchanger or radiator 38. The heated fluid enters the top of the radiator 38 and exhausts the bottom of the radiator 38 through a port 40.

The port 40 exhausts into a radiator-to-pump line 42. The pump line 42 interconnects at its far end with a coolant pump 44.

Interconnecting the inner tank 20 and the line 42 is a radiator bypass line 46. This line serves to deliver heated, pressurized fluid to the inlet of the coolant pump 44. Accordingly, by inputting pressurized fluid into the line 42, any drop of pressure across the radiator 38 is substantially compensated for, thus providing a maximum inlet pressure at the coolant pump 44.

Preferably, the components of the system according to the present invention are composed of aluminum to thereby maximize heat dissipation and to reduce as much as possible the overall weight of the system.

Having described my invention, however, many modifications thereto will become apparent to those skilled in the art to which it pertains without deviation from the spirit of the invention as defined by the scope of the appended claims.

I claim:

1. A cooling system for liquid cooled engines having an engine coolant discharge port, said cooling system comprising:

an exchange tank;

said exchange tank having an exterior wall and an interior wall;

said exterior wall and said interior wall defining an outer tank, said outer tank having a first pressure region therebetween;

said interior wall defining an inner tank, said inner tank being surrounded by said outer tank, said inner tank defining a second pressure inner region therein;

at least one first fluid transfer line disposed between said engine coolant discharge port and said exchange tank for delivering a coolant fluid from said engine to said exchange tank;

at least one second fluid transfer line disposed between said exchange tank and said engine for delivering said coolant fluid from said exchange tank to said engine;

means for cooling said coolant fluid disposed in fluid communication with said second fluid transfer line; and means for transferring gases from said coolant fluid delivered to said exchange tank by said first fluid line to said second pressure region of said inner tank.

2. The cooling system of claim 1 further comprising means for maintaining said first pressure region at a higher pressure than said second pressure region.

3. The cooling system of claim 2 wherein said second pressure region of said inner tank defines a collecting place for coolant fluid and for gases transferred from said coolant fluid disposed within said first pressure region.

4. The cooling system of claim 3 wherein said means for transfering gases comprises at least one gas-transferring aperture provided through said interior wall through which gas passes from said coolant fluid circulating within said first pressure region to said second pressure region.

5. The cooling system of claim 4 wherein said gas-transferring aperture is situated above the level of coolant contained within said second pressure region.

6. The cooling system of claim 5 wherein said interior wall has further provided therein a fluid transfer aperture interconnecting said second pressure region and said first pressure region for the transfer of said coolant fluid from said second pressure region to said first pressure region.

7. The cooling system of claim 6 wherein said second pressure region includes a filler tube.

8. The cooling system of claim 1 further including a fluid pump having an inlet end fluidly interconnected with said at least one second fluid transfer line.

9. The cooling system of claim 8 further comprising means for maintaining said inlet end of said fluid pump and said second pressure region at substantially equal pressures.

10. The cooling system of claim 9 wherein said means for cooling comprises at least one heat exchanger, and wherein said at least one second fluid transfer line comprises a third fluid transfer line connecting said inlet end of said pump to said heat exchanger.

11. The cooling system of claim 10 further including a fourth fluid line interconnecting said second pressure region of said inner tank to said third transfer fluid line to maintain the pressure in said second pressure region equal to the pressure in said third fluid transfer line.

12. The cooling system of claim 1 wherein the temperatures of said coolant fluid within said engine coolant discharge port, said first pressure region and said second pressure region are substantially identical.

* * * * *